United States Patent [19]

Maxwell

[11] 4,215,243

[45] Jul. 29, 1980

[54] AUTOMATIC MODEM IDENTIFICATION SYSTEM

[75] Inventor: Ronald K. Maxwell, Palo Alto, Calif.

[73] Assignee: Racal-Vadic Inc., Sunnyvale, Calif.

[21] Appl. No.: 961,849

[22] Filed: Nov. 17, 1978

Related U.S. Application Data

[63] Continuation of Ser. No. 752,205, Dec. 20, 1976, abandoned.

[51] Int. Cl.² ........................................... H04M 11/00
[52] U.S. Cl. .................................. 179/2 DP; 364/200
[58] Field of Search ........... 179/2 DP, 2 AM, 15 BV; 364/200

[56] References Cited

U.S. PATENT DOCUMENTS

| | | | |
|---|---|---|---|
| 3,569,943 | 3/1971 | Mackie et al. | 364/200 |
| 3,676,858 | 7/1972 | Finch et al. | 364/200 |
| 4,000,371 | 12/1976 | Ogawa | 179/2 DP |

*Primary Examiner*—James W. Moffitt
*Assistant Examiner*—Joseph A. Popek
*Attorney, Agent, or Firm*—Lowhurst & Aine

[57] ABSTRACT

Apparatus for communicating between a number of remote use terminals and a central computer. The apparatus initially answers an incoming call under concentrator control, and transmits an answer tone to the calling terminal. The terminal user places the modem at the terminal in data mode. The apparatus detects which modem type called, conditions the concentrator port interface and connects an answering modem of the same type into the circuit between the telephone line and the concentrator port. The port automatically detects speed and code, and conditions the computer adapter clock and software appropriately to be compatible. The user experiences no change in existing connection sequences and only one telephone number is necessary for servicing a number of different modem types having common access to the computer.

11 Claims, 4 Drawing Figures

Fig_1

Fig_2
FROM INTERFACE LOGIC

STATE CONTROL TRANSITION DIAGRAM

AUTOMATIC MODEM IDENTIFICATION SYSTEM

This is a continuation, of application Ser. No. 752,205, filed Dec. 20, 1976 now abandoned.

BACKGROUND OF THE INVENTION

1. Field of the Invention

The invention relates to data transmission apparatus and more specifically to means for automatically recognizing one of a plurality of calling modem types and for switching a compatible modem into the answering circuits.

2. Description of the Prior Art

Existing computer ports are capable of handling speeds of up to 2400 bits per second in the asynchronous mode and of speeds of 2400 bits, 4800 bits, 9600 bits, and 19.2 kilobits per second in the synchronous mode. However, existing modems that connect to the computer port are restricted in speed. Six examples of such modems are the Bell 103 operating at 300 bits per second; the Bell 202, operating at 1200 bits per second; the Bell 201 operating at 2400 bits per second; the Vadic 3400 operating at 1200 bits per second; the Bell 208 operating at 4800 bits per second; and the Bell Touch Tone which operates at a set of different frequencies. At the computer interface the modems are handled with similar protocols. However, at the telephone line interface the modems operate with distinct protocols. A terminal user communicating with a computer must communicate with a modem at the computer that is compatible with the modem utilized by the terminal. Thus, even though the computer port is capable of satisfying a wide range of modems, in order to service terminals having differing types of modems a separate computer port must be dedicated to each modem type serviced. This is economically wasteful because the use of any one particular modem is limited to a total of five to ten minutes per day. This means that each computer port is inactive a large portion of the time.

The existence of more than one modem type obligates a time sharing company to dedicate ports and telephone lines to data rate subsets corresponding to modem speeds and not to the computer port speed. Dividing ports into various speeds generally reduces system efficiency and bandwidth utilization. More telephone lines must be used to minimize customer busy conditions than would be needed if only one modem type existed. The more telephone lines needed means more adapter hardware at the computer ports and usually additional concentrator common equipment. Separate modem groups also require separate telephone numbers creating service confusion and additional costs.

SUMMARY OF THE INVENTION

It is a principal object of the invention to provide an automatic modem identification apparatus that eliminates modem groups, separate telephone numbers, and excess line and port hardware for asynchronous communications over dial-up telephone lines.

It is a further object of the invention to provide an apparatus which automatically answers incoming calls, identifies the calling modem, and switches an appropriate answering modem into the circuit.

It is also an object of the invention to provide an automatic modem identification system which preserves standard connect and disconnect protocols and automatic dialing capabilities available with some existing modem types.

It is also an object of this invention to provide an automatic modem identification system which minimizes changes in existing customer connection protocols and further minimizes changes in existing concentrator hardware and software.

Briefly, the above objects are accomplished in accordance with the invention by providing a modem of a first type which is initially connected to a telephone line to receive all incoming calls and to initially answer said calls by generating an answer tone which is compatible with all of the modems having access to the system. Upon answering a call, the first modem engages a counter to time a first time period and a second time period which is subsequent to the first time period. The first modem then monitors the telephone line to detect an originate mark carrier uniquely identifying the first modem type. If the carrier is not detected within the first time period, circuits automatically switch to a modem of a second type and monitor the telephone line for an originate mark carrier uniquely identifying the second modem type.

If the originate mark carrier uniquely identifying a modem of the first type is detected during the first time period, connection is maintained between the first modem and the computer port and communication is commenced.

In the event that the second modem type is switched into the circuit and the originate mark carrier uniquely identifying the second modem type is detected during the second time period, then a connection is established between the second modem and the computer port and communication is commenced utilizing the second modem.

In the event that neither originate mark carrier is detected, the entire procedure is repeated.

The invention has the advantage that only one telephone line is needed to handle a number of differing modem types having common access to a single computer port. This minimizes service confusion and the general annoyance which occurs when separate telephone numbers are utilized in time sharing equipment.

The invention has the further advantage that no change to existing modem dialing protocols is necessary and therefore the users need not learn a new procedure nor must any changes be made in existing modem hardware.

Furthermore, the invention imposes no changes to existing computer concentrator port hardware and takes advantage of the fact that existing concentrator interfaces can automatically detect line speeds and codes for a large number of modem types.

The foregoing and other objects features and advantages of the invention will be apparent from the following more particular description of the preferred embodiment of the invention as illustrated in the accompanying drawings.

DESCRIPTION OF THE PREFERRED EMBODIMENT

INDIVIDUAL MODEM CONTACT PROTOCOLS

Figure 1:
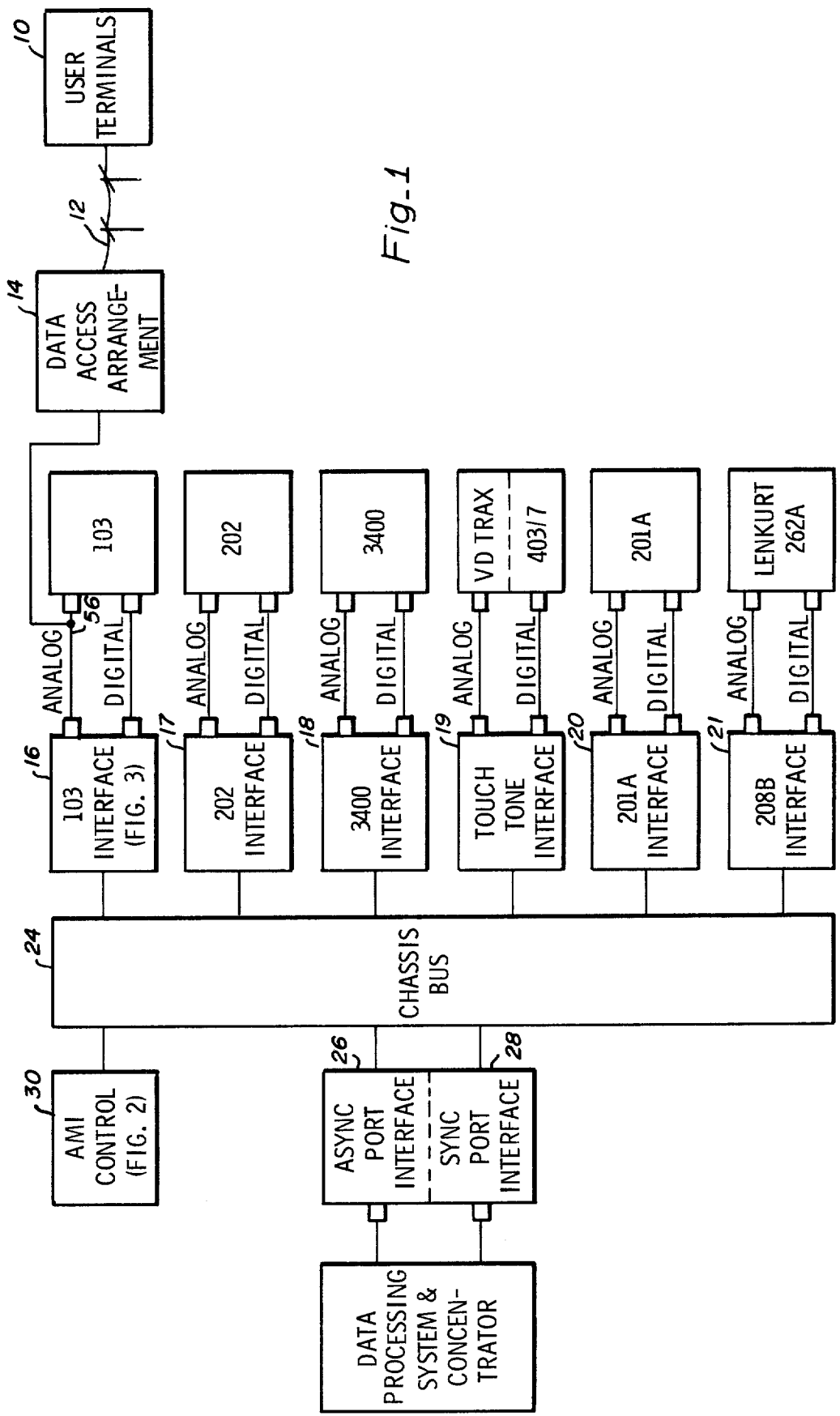
FIG. 1 is an overall block diagram of a communication system in which the automatic modem identification apparatus of the present invention is employed.

The Bell 103 compatible, the Bell 202 compatible, the Bell 201 compatible, the Bell 209 compatible, the Bell Touch Tone compatible and Vadic VA23400 modem types all begin communication in the same way. The calling party manually or automatically dials the time sharing serivce telephone number. The central office switching equipment routes the call to an available telephone line, applies ringing voltage, and waits for an answer. An answering circuit connected to the incoming line detects ringing, turns on a ring indicator, answers the call when data terminal ready is energized, and then turns on data set ready after a short delay. The procedures after this initial set up for each modem type differ.

Bell 103 Compatible Protocol

After data set ready has been energized, the 103 answering modem turns on a 2225 Hz mark carrier in the high channel. This tone disables echo suppressors in the telephone switching circuits, conditions automatic calling units to transfer line control to the calling modem, and turns on a carrier detector in the calling modem. The calling modem responds by sending a 1270 Hz originate mark carrier in the low channel after a short delay. The answering modem receives originate carrier, turns on clear to send and carrier detect, and releases mark hold on transmit and receive data. Data can now be transmitted in both directions, simultaneously, at rates up to 300 bits per second.

If the answering control circuits do not detect carrier after two minutes from the first detection of ringing then the answering modem disconnects the call by turning data terminal ready off. Futhermore, the control circuits disconnect the call after customer log out or after loss of carrier for several seconds.

Bell 202 Compatible Protocol

When data set ready is energized, a 202 answering modem transmits answer tone (202 Hz) for three seconds, and then transfers all transmission control to the concentrator answering circuits. The user waits for the end of the audible answer tone, puts the modem in data mode, and then transmits a terminal identifier. The concentrator responds by turning on request to send and transmitting the start of a system sign on message. All transmission is in one direction only, although a reverse channel provides a slow speed data path in a direction which is opposite to the main data flow.

Vadic VA3400 Modem Protocol

This modem combines the 202 and the 103 protocols. After data set ready has been energized, the 3400 sends an answer tone (2025Hz) for three seconds then switches the transmit signal to mark carrier in the low channel. The user puts the modem in data mode by lifting the data key which detects the answer carrier and then transmits an originate mark carrier, releasing mark hold on transmit and receive date 50 milliseconds later. The answering modem detects originate carrier, waits 60 milliseconds, then turns on carrier detect and clear to send. The data is then transmitted in full duplex at 1200 bits per second or at 300 bits per second and below. The disconnect protocols are identical with the 103.

Other Modem Types (Bell 201A, Bell 208B And Touch Tone)

These modems follow the general procedures described with respect to the Bell 202 with the exception that most of them do not incorporate reverse channels. Thus, after transmitting an answer tone all transmission controls are supplied by the concentrator. The 201A and 208B modems use the synchronous port.

Automatic Identification

Referring now to FIG. 1, user terminals 10 are connected over the telephone line 12 which terminates in a Bell Telephone data access arrangement (DAA) 14. The DAA is connected to the 103 type modem interface 16 which in turn is connected to the chassis bus 24 of the automatic modem identification (AMI) system. Modems of each type which have common access over the telephone line are also attached to the AMI. In the example shown in FIG. 1, the modems 202, 201A, 3400, 208B and touch tone (TT) are attached.

The port interfaces 26, 28 at the computer concentrator conform to the Electronic Industries Association (EIA) interface specified for business machine/data set connections, officially defined in "Interface Between DP Terminal Equipment and Data Communication Equipment" RS 232, and revisions thereto. The EIA interface provides both a synchronous interface signal port and an asynchronous interface signal port. Throughout this specification these signals will be referred to using the EIA standard nomenclature.

Initially, an identification sequence begins with data terminal ready off at the port interfaces. The AMI control 30 detects an incoming ring signal, and passes this signal to both the synchronous and the asynchronous ports. Each port responds with data terminal ready, and when both ports have responded the AMI control answers the call and turns on data set ready at both ports.

The AMI control commences a modem identification sequence by connecting 2225Hz to the telephone line for six seconds. This tone disables echo surpressor in the telephone circuits and sounds like an answer tone to the user. This tone also conforms to the mark carrier requirement for the 103 modem. If within the six second time interval the AMI detects a 103 originate mark carrier (1270Hz) from the calling modem, it retains the 103 connection by linking the 103 modem interface 16 to the asynchronous port through the chassis bus, and by turning data set ready off at the synchronous port. Thus the EIA connections are maintained between the 103 modem and the computer port.

If the 103 originate mark carrier is not detected within the six second time period, the identification procedure continues. Control is transferred to the 3400 modem which is set to answer mode. Switching from the 103 modem to the 3400 modem disables the answer tone and connects 3400 answer mark carrier to the telephone line. The answer mark carrier is transmitted to the calling modem for 500 milliseconds while the AMI control monitors the telephone line for the 3400 originate mark carrier. If the AMI receives the 3400 originate mark carrier signal, it establishes a connection between the 3400 and the asynchronous port and turns data set ready off at the synchronous port.

If the AMI fails to detect the 3400 originate mark carrier, the modem identification sequence continues.

The remaining modems are searched as a group in parallel. First, the telephone line signal is switched to the 202 type modem reverse channel tone of 387Hz. The AMI control monitors the telephone line for a response from one of the remaining four modems according to their particular protocals as follows:

202 modem—1200Hz (mark carrier)
201A modem—1125, 2125Hz (mark pattern)
208B modem—600Hz
Touch Tone modem—941, & 1477Hz (corresponding to the #key)

The following protocals are observed for each of the modem types:

202 Modem

If the AMI control detects 202 mark carrier, it links the 202 modem interface to the asynchronous port and disables data set ready to the synchronous port. Disconnect requires that data terminal ready be off at both ports.

Touch Tone Modem

If the AMI detects the frequencies associated with the #key, the following reconnect sequence establishes a touch tone link as follows:

1. Turn data set ready off at both port interfaces.
2. Wait until data terminal ready is off at both ports.
3. Turn the ring indicator on and secondary receive data on at the asynchronous port only.
4. Turn the ring indicator and the secondary receive data off in response to data terminal ready being re-energized.
5. Turn on data set ready. The AMI control then turns control over to the touch tone interface.

201A Modem

If the AMI detects the 201A mark pattern frequencies, it links the 201A interface to the synchronous port and turns data set ready off at the asynchronous port. Disconnect requires both data terminal ready inputs to be off.

208B Modem

If the AMI control detects the 600Hz tone it links the 208B interface to the synchronous port while turning data set ready off at the asynchronous port.

Should no modems be detected, the AMI control returns control to the 103 modem interface and repeats the entire identification sequence. The process iterates until data terminal ready has been turned off at both ports.

Chassis Bus

The AMI control logic 30, the asynchronous port interface 26, the synchronous port interface 28, and the modem interfaces 16–22 are interconnected by means of the common chassis bus 24. This bus allows transmit data from either port to be sent to any of the modem interfaces and permits received data from any modem interface to be sent to the port interfaces. The modem control signals and the port interface control signals are interconnected by the bus as set forth in the following table:

TABLE I

| | | CHASSIS BUS CONNECTIONS | | | | | | | | |
|---|---|---|---|---|---|---|---|---|---|---|
| | | CONTROL LOGIC | SYNC PORT | ASYNC PORT | 201 | 208 | TT | 202 | 3400 | 103 |
| CONTROL LOGIC INPUTS: | | | | | | | | | | |
| Carrier Detect (SYNC) | CFS | X | X | | X | X | | | | |
| Carrier Detect (TT) | CFTT | X | | | | | X | | | |
| Carrier Detect (ASYNC) | CFA | X | | X | | | | | | |
| Data Set Ready (103) | CC103 | X | | | | | | | | X |
| Data Term. Ready (ASYNC) | CDA | X | | X | | | | | | |
| Data Term. Ready (SYNC) | CDS | X | X | | | | | | | |
| Ring Indicator (FROM 103) | CEA | X | X | | | | | | | X |
| CONTROL LOGIC OUTPUTS: | | | | | | | | | | |
| Secondary RCV Data | SBB | X | | X | | | | X | | |
| Select (3400) | SEL3400 | X | | | | | | | X | |
| Select (OTHER) | SEL OTHER | X | | | X | X | X | X | | |
| Select (103) | SEL 103 | X | | | | | | | | X |
| Data Set Ready (PORTS) | CC PORTS | X | X | X | | | | | | |
| Data Term. Ready (103) | CD 103 | X | X | X | X | X | X | X | X | X |
| Ring Indicator (SYNC) | CES | X | X | | | | | | | |
| PORT/MODEM INTERFACE LOGIC: | | | | | | | | | | |
| Request to Send | CA | | X | X | X | X | X | X | X | X |
| Transmit Data | BA | | X | X | X | X | X | X | X | X |
| Receive Data | BB | | X | X | X | X | X | X | X | X |
| Clear to Send | CB | | X | X | X | X | X | X | X | X |
| Data Set Ready | CC | | X | X | X | X | X | X | X | X |
| Secondary Transmit Data | SBA | | | X | | | | X | | |
| Transmit Clock | DB | | X | | X | X | | | | |
| Receive Clock | DD | | X | | X | X | | | | |

Modem Interface Logic

Figure 2:
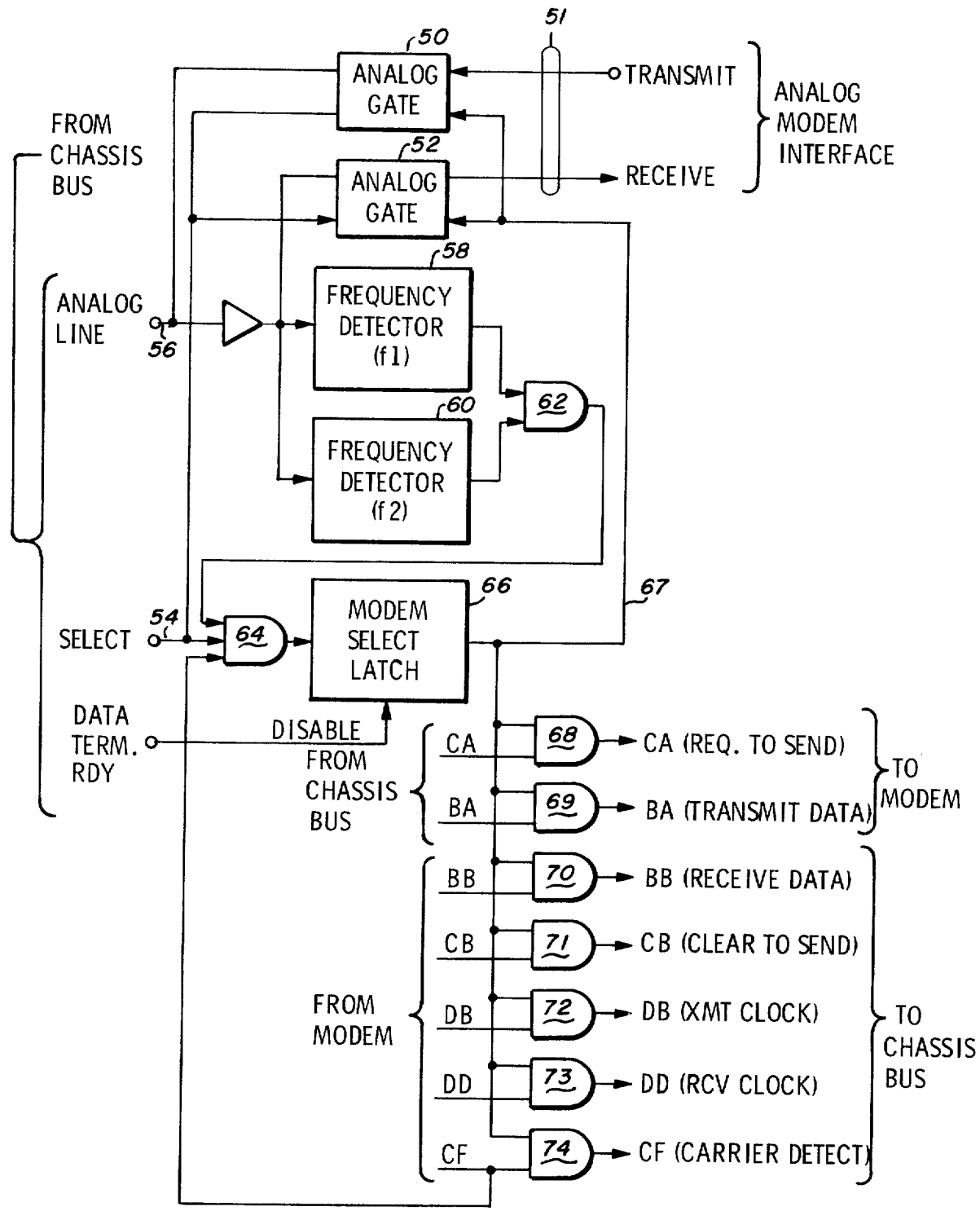
FIG. 2 is a more detailed block diagram of the modem interface logic of the automatic modem identification apparatus of FIG. 1.

Referring now to FIG. 2, the modem interface logic of FIG. 1 is shown in more detail. Each of the six modems are similar. However, their connections to the chassis bus differ slightly and these connections are shown in Table I. As described previously, some modems detect more than one frequency and therefore two frequency detectors 58, 60 are shown. The analog input 51 from each modem connects to the modem interface logic through gates 50, 52. These gates are selected by means of the modem select latch output 67. The frequency detectors 58, 60 are tuned to detect the carrier frequency of the particular modem type connected to the interface logic. The output of the frequency detectors is anded in and circuit 62, the output of which energizes one leg of and circuit 64 along with the select line 54. When all of these conditions are met, then the modem select latch 66 is turned on thus gating the digital signals from the chassis bus and from the modem through the and circuits 68–74.

AMI Control Logic

Figure 3:
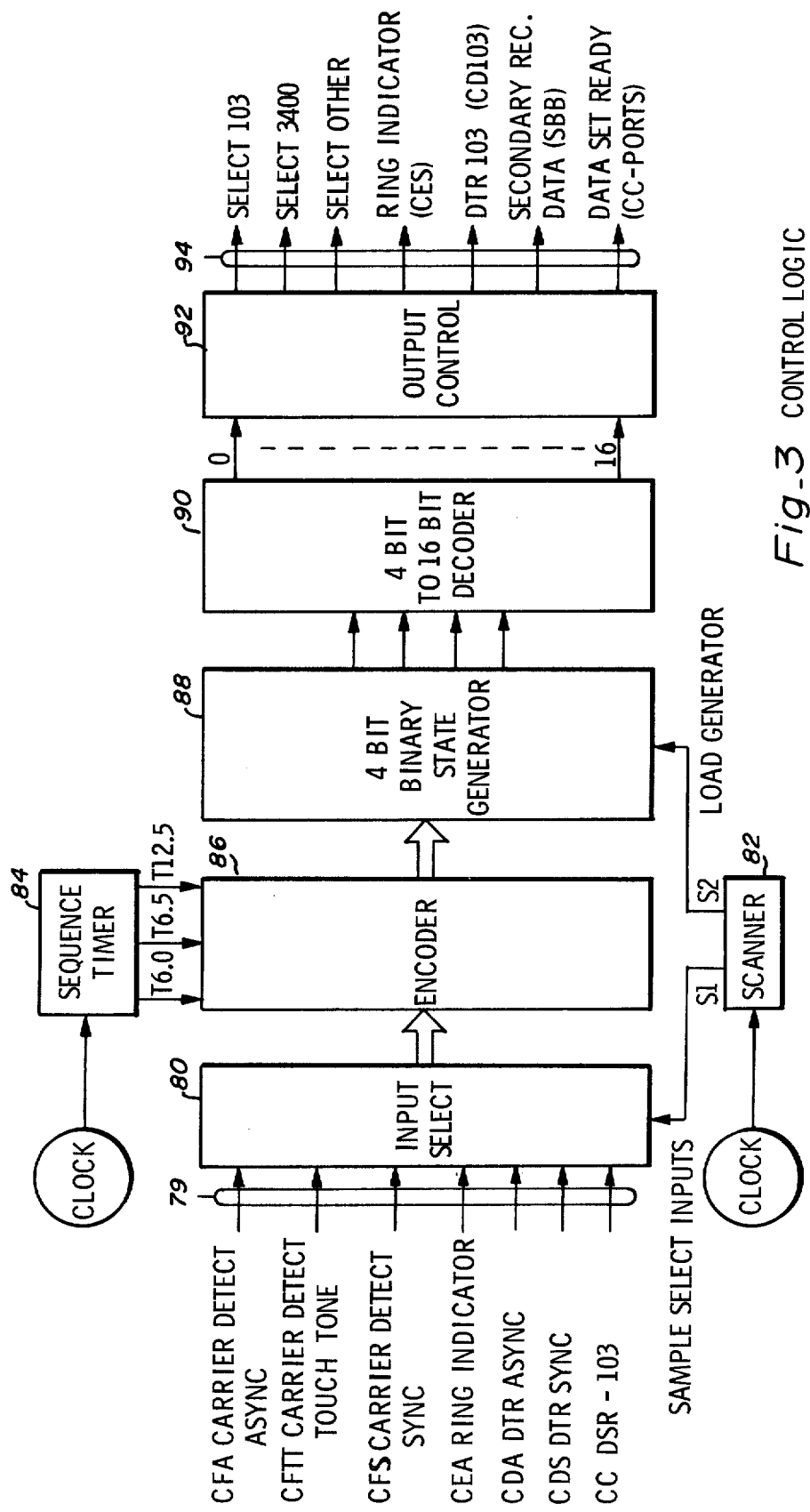
FIG. 3 is a more detailed block diagram of the control logic.

Referring now to FIG. 3, a more detailed diagram of the AMI control logic of FIG. 1 is shown. The control logic inputs 79 (Table I) enter an input select logic block 80. These select inputs are sampled by a line S1 from the scanner 82. A sequence timer 84 is provided and produces outputs at various time intervals, 6 seconds, 6.5 seconds, and 12.5 seconds. These outputs are combined in an encoder 86 with the outputs from the input select 80 which outputs have been sampled by the scanner 82. The outputs of the encoder 86 drive a four bit binary state generator 88 to produce a unique one of sixteen binary states corresponding to the unique state of the input to the encoder. The four bit output of the binary state generator is decoded by a four to sixteen bit decoder 90 which energizes one of sixteen output lines corresponding to one of the sixteen unique states. These output lines energize output control logic 92 to produce signals on the control logic output lines 94 (shown in Table I).

State Control Transitions

Figure 4:
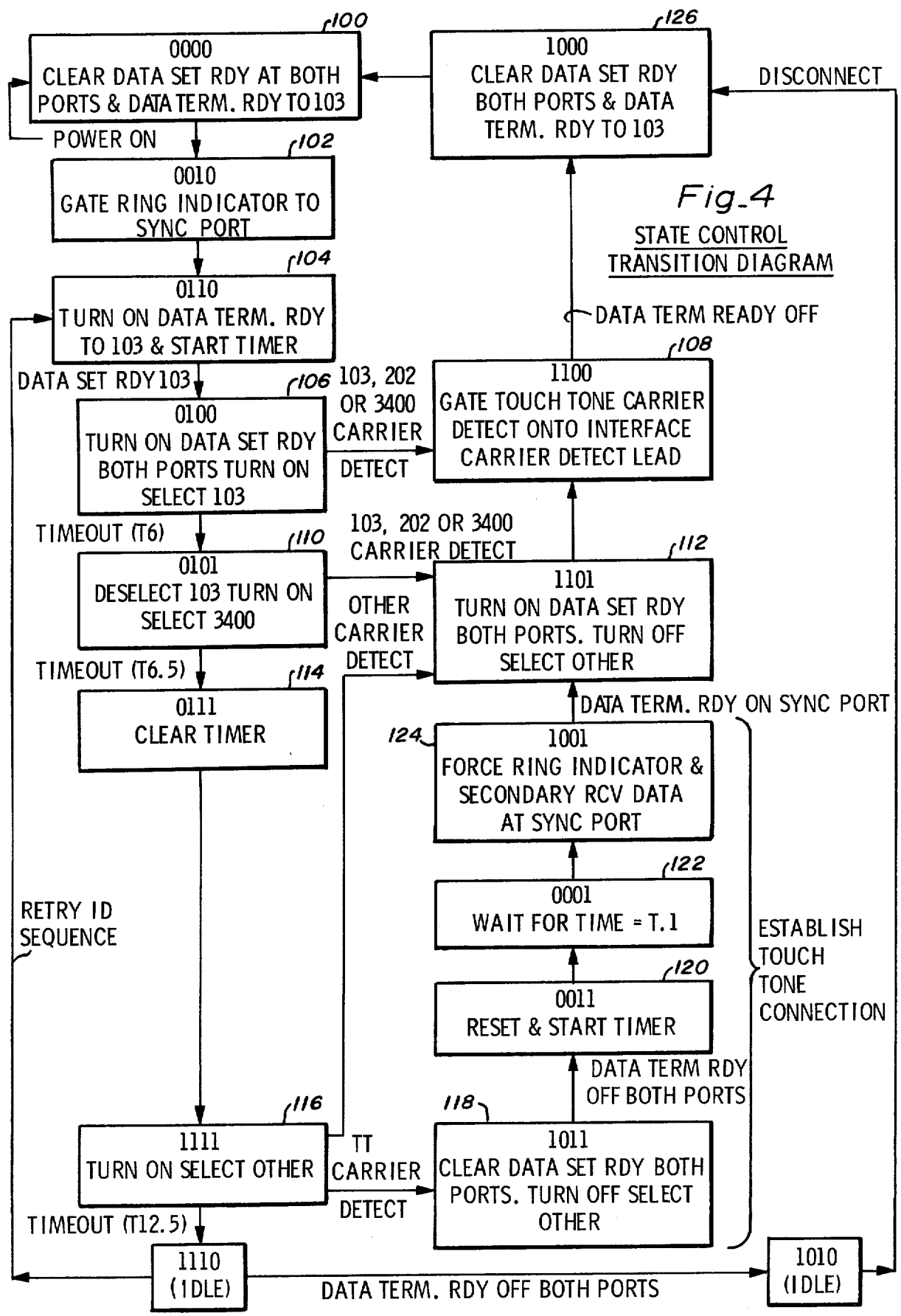
FIG. 4 is a state control transition diagram of the control logic of FIG. 2.

The operation of the control logic of FIG. 3 is best described with reference to the state control transition diagram shown in FIG. 4. Each block in FIG. 4 contains a unique four bit binary number which corresponds to the output of the four bit binary state generator 88. These states are decoded by the decoder 90 which energizes output control 92 to thereby generate the states called for within each of the logic blocks of FIG. 4.

The control sequence starts when power on is energized. At block 100, power on clears data set ready at both ports, and resets data terminal ready to the 103 modem. The state counter is set to 0000.

The sequence proceeds to block 102. When the control logic detects ringing with data terminal ready off at both ports, the ring indicator is passed to the synchronous port. The ring indicator from the 103 modem is always connected to the asynchronous port and all incoming calls are answered initially by the 103 modem. The state counter is set to 0010.

The sequence proceeds to block 104. When data terminal ready turns on at both the synchronous and the asynchronous ports, the control logic turns on data terminal ready to the 103 modem thus answering the telephone call. The sequence timer 84 is reset to start at zero at this point. The state counter is set to 0010.

The sequence proceeds to block 106 when data set ready from the 103 modem turns on, the control logic turns on data set ready at both ports and turns on the select 103 line to the 103 interface. Control logic now monitors the analog line 56 to detect the carrier frequency. The three modem carrier detects for modems 103, 202 and 3400 are tied together. If the carrier detect signal comes on, the state counter is set to 1100 and control is transferred to block 108. The connection is maintained between the 103 modem and the chassis bus so that the telephone call is now handled by the 103 modem until disconnection occurs. When data terminal ready goes off at both ports, the call is terminated and the conrol logic turns data terminal ready to the 103 modem off and clears data set ready at both ports.

If the carrier detect stays off, and the sequence timer 84 counts out to six seconds (T6), the time out T6 causes the state counter to transfer to 0101, block 110. The control logic selects the 3400 interface 19 and connects it to the chassis bus 24. New if carrier detect comes on, this indicates that a 3400 modem has been identified. In this event, the state counter changes to 1101, block 122, which causes data set ready to be turned on at both port interfaces.

If the carrier detect stays off at block 110, the timer times out at 6.5 seconds (T6.5) and the state is transferred to 0111 which is represented by block 114. The timer is cleared and the state counter is stepped to 1111 represented by block 116. At this block, the control logic selects four modem interfaces in parallel by turning on the "select other" line. When any one of the modem interfaces detects a carrier, it turns off the select line to indicate identification. If the carrier is not a touch tone carrier, the sequence transfers to 1101 which is block 112 previously described.

If the touch tone carrier is detected at block 116, the control logic steps through a sequence to establish a touch tone connection starting with logic block 118 corresponding to state 1011 of the state generator. At block 118, data set ready is cleared at both ports. The sequence steps on 0011, block 120 and the control logic resets and starts with time to wait for data terminal ready to go off at both ports. At block 124, the ring indicator and the secondary receive data lines are turned on at the asynchronous port only. When data terminal ready comes on at the asynchronous port, the logic turns data set ready on (block 112) and at block 108 gates the touch tone carrier detect onto the interface carrier detect line and then waits for data terminal ready to turn off in which event the control transfers to block 126 for a disconnect.

If the select other line stays on at T12.5 indicating that no modem was identified with the calling modem (block 116), the control logic steps to state 0110, block 104, and retries the identification sequence. If data terminal ready is off at both the synchronous and the asynchronous ports, the control logic proceeds to disconnect block 126.

SUMMARY

What has been described is a method and apparatus for identifying a particular modem type from a plurality of different modems which have common access to a computer. Initially all incoming calls are answered with a modem of a first type which detects a ring signal and provides an appropriate answering response signal. Control logic monitors the telephone line during a first time period to detect a first carrier frequency which is unique to a modem of the first type. If the first carrier frequency is detected during said first time period, communication with the modem of the first type is maintained until a disconnect occurs.

In the event that the first carrier frequency is not detected within the first time period, the control logic monitors the telephone line during a second time period to detect a second carrier frequency which is unique to a modem of a second type. If the second carrier frequency is detected before the end of the second time period, the control logic establishes communication with the modem of the second type and the identification procedure is ended. In the event that neither carrier frequency is detected during the corresponding time period, then the entire sequence is repeated until a disconnect condition is detected.

Additional modems can be identified by adding additional logic for detecting their respective frequencies. Furthermore, if modems have common characteristics, their frequencies are searched for in parallel thus saving time.

While the invention has been shown and described with reference to a preferred embodiment thereof, it will be understood by those skilled in the art that various changes in form and details may be made therein without departing from the spirit and scope of the invention.

What is claimed is:

1. The method of identifying a particular modem type from a plurality of modem types having common access to a port over a telephone line, wherein said modem types include at least a first and a second modem type, comprising the steps of:
    (a) answering all the incoming calls received over said telephone line with an answering modem of said first type by transmitting for a first time period an answer mark carrier of a frequency which is not only unique to an answering modem of said first type but is also compatible with any other of said modem types;
    (b) monitoring said telephone line during said first time period to detect an originate mark carrier of a frequency unique to a calling modem of said first type;
    (c) maintaining communication with said calling modem of said first type upon the condition that the originate mark carrier detected within said first time period is of a frequency unique to a calling modem of said first type;
    (d) if no originate mark carrier is detected during said first time period, transmitting an answer mark of a frequency unique to an answering modem of said second type for a second time period;
    (e) monitoring said telephone line during said second time period to detect an originate mark carrier of a frequency unique to a calling modem of said second type; and
    (f) maintaining communication with said calling modem of said second type upon the condition that the originate mark carrier detected within said second time period is of a frequency unique to a calling modem of said second type.

2. The method set forth in claim 1 in which all steps are repeating until a connection is established.

3. The method set forth in claim 1, in which the plurality of modem types includes a third modem type, which includes the further steps of:
    (g) if no originate mark carrier is detected during said second time period, transmitting an answer supervisory signal for a third time period;
    (h) monitoring said telephone line during said third time period to detect one of a plurality of originate mark carriers of a frequency unique to one of a plurality of calling modems of a type other than said first and second type; and
    (i) maintaining communication with the detected calling modem upon the condition that the originate mark carrier detected within said third time period is of a frequency unique to a calling modem of said third type.

4. The method set forth in claim 3 in which all steps are repeating until a connection is established.

5. The method of automatically detecting a calling modem type from a plurality of different modem types having common access to common communication apparatus and of connecting an appropriate answering modem in circuit with said calling modem at a computer port, each calling modem being identifiable by a unique originate mark carrier generated by said modem, said method comprising the steps of:
    (a) connecting a modem of a first type in circuit with incoming calls to answer all incoming calls by transmitting a data transmit ready signal detectable by each of the plurality of different modem types;
    (b) clocking a first time period subsequent to said ready signal and a second time period subsequent in time to said first time period;
    (c) transmitting during said first time period an answer mark carrier of a frequency which not only corresponds to the answer mark carrier of said first type modem but which is also compatible with any other of said modem types;
    (d) monitoring said calling modem during said first time period to detect a first originate mark carrier uniquely idenifying a modem of said first type;
    (e) changing said transmitting answer mark carrier to a frequency corresponding to the answer mark carrier of a modem of said second type during said second time period;
    (f) monitoring said calling modem to detect a second originate mark carrier uniquely identifying a modem of said second type;
    (g) establishing a connection between said first modem and said computer portion upon the condition that said first originate mark carrier is detected within said first time period; and
    (h) establishing a connection between said second modem and said computer port upon the condition that said second mark carrier is detected within said second time period.

6. The method of claim 5 in which the steps (c) and (e) are repeated until a connection is established.

7. The method of claim 5 which includes the further steps of:
    (i) clocking a third time period subsequent to said second time period;
    (j) changing said transmitting answer mark carrier to a frequency corresponding to the answer mark carrier of a modem of said third type during said third time period;
    (k) monitoring said calling modem to detect a third originate mark carrier uniquely identifying a modem of said third type;
    (l) establishing a connection between said third modem and said computer port upon the condition that said third mark carrier is detected within said third time period.

8. The method of claim 5 in which said answer mark carrier corresponding to said first modem type has a frequency of 2225 Hz.

9. The method of claim 8 in which said first originate mark carrier has a frequency of 1270 Hz.

10. The method of claim 8 in which said answer mark carrier corresponding to said second modem type has frequencies of 851 Hz and 1450 Hz.

11. The method of claim 10 in which said second originate mark carrier has frequencies of 1950 Hz and 2550 Hz.

* * * * *